United States Patent
Dhayni et al.

(10) Patent No.: US 9,425,907 B2
(45) Date of Patent: Aug. 23, 2016

(54) LOOPBACK-BASED BUILT-IN-SELF-TEST

(71) Applicant: ST-Ericsson SA, Plan-les-Ouates (CH)

(72) Inventors: Achraf Dhayni, Vallauris (FR); Christophe Arnal, Saint Vallier de Thiey (FR)

(73) Assignee: ST-ERICSSON SA, Plan-les-Ouates (CH)

(*) Notice: Subject to any disclaimer, the term of this patent is extended or adjusted under 35 U.S.C. 154(b) by 0 days.

(21) Appl. No.: 14/433,893

(22) PCT Filed: Nov. 7, 2013

(86) PCT No.: PCT/EP2013/073268
§ 371 (c)(1),
(2) Date: Apr. 7, 2015

(87) PCT Pub. No.: WO2014/072406
PCT Pub. Date: May 15, 2014

(65) Prior Publication Data
US 2015/0270912 A1   Sep. 24, 2015

Related U.S. Application Data

(60) Provisional application No. 61/762,539, filed on Feb. 8, 2013.

(30) Foreign Application Priority Data

Nov. 7, 2012 (EP) .................................. 12306371

(51) Int. Cl.
*H04B 5/00* (2006.01)
*H04B 17/20* (2015.01)
(Continued)

(52) U.S. Cl.
CPC .............. *H04B 17/20* (2015.01); *H04B 5/0031* (2013.01); *H04B 17/14* (2015.01); *H04B 17/15* (2015.01); *H04B 17/19* (2015.01); *H04B 17/29* (2015.01); *H04B 17/408* (2015.01); *H04L 1/243* (2013.01)

(58) Field of Classification Search
CPC ........ H04L 1/243; H04B 17/14; H04B 17/15; H04B 5/0031; H04B 17/29; H04B 17/408; H04B 17/20; H04B 17/19
See application file for complete search history.

(56) References Cited

U.S. PATENT DOCUMENTS 5,502,653 A   3/1996 Lewis
7,049,839 B1*  5/2006 Hsiao ................. G01R 31/3187
                                              324/750.3
(Continued)

OTHER PUBLICATIONS

International Search Report issued in corresponding International application No. PCT/EP2013/073268, date of mailing of search report Mar. 20, 2014.
(Continued)

*Primary Examiner* — Ping Hsieh
(74) *Attorney, Agent, or Firm* — Patent Portfolio Builders PLLC

(57) ABSTRACT

A method of self-test for a near-field communication (NFC) radio frequency (RF) front-end unit comprising one antenna driver and at least one unit from a group comprising one reader and one card emulator, the RF front-end unit being connected to a digital front-end unit, wherein the antenna driver and the unit are interconnected through a first connection line via their respective first input-output interface and are also interconnected through a second connection line via their respective second input-output interface, the digital front-end unit being connected to the second connection line, the method comprising: activating the antenna driver and the unit based on control signals; —generating a first signal onto the first connection line by modulating a respective first bitstream; —retrieving a second bitstream from the second connection line, by demodulating the first signal; and, —determining an outcome of the self-test by monitoring the demodulated signal.

12 Claims, 3 Drawing Sheets

(51) Int. Cl.
*H04L 1/24* (2006.01)
*H04B 17/14* (2015.01)
*H04B 17/15* (2015.01)
*H04B 17/19* (2015.01)
*H04B 17/29* (2015.01)
*H04B 17/40* (2015.01)

(56) References Cited

U.S. PATENT DOCUMENTS

| | | |
|---|---|---|
| 2004/0177301 A1 | 9/2004 | Tarango et al. |
| 2004/0204912 A1 | 10/2004 | Nejedlo et al. |
| 2007/0264730 A1* | 11/2007 | Frodsham ........ G01R 31/31716 438/14 |
| 2008/0171517 A1 | 7/2008 | Ali et al. |
| 2010/0153799 A1 | 6/2010 | Maroni et al. |
| 2012/0220240 A1* | 8/2012 | Rothschild ............ H04B 17/29 455/67.11 |

OTHER PUBLICATIONS

Written Opinion of the International Searching Authority issued in corresponding International application No. PCT/EP2013/073268, date of mailing Mar. 20, 2014.

Kim, Boyon et al., "An Advanced Full Path Loop-Back Testing Techniques for Embedded RF Identification (RFID) System-on-a-Chip (Soc) Applications," 2008 IEEE MTT-S International Microwave Symposium Digest, Piscataway, NJ, USA, Jun. 15, 2008, pp. 85-89, XP031441536, DOI: 10.1109/MWSYM.2008.4633308; ISBN: 978-1-4244-1780-3.

* cited by examiner

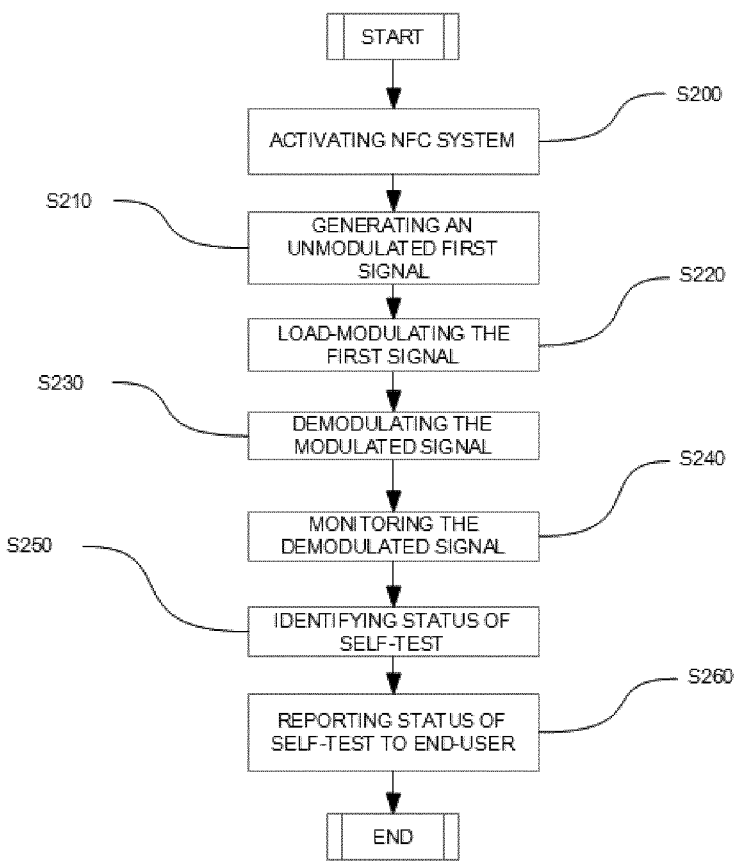

LOOPBACK-BASED BUILT-IN-SELF-TEST

TECHNICAL FIELD

The present disclosure relates generally to wireless communications and, more particularly, to the test of Radio Frequency (RF) systems. It finds applications, for instance, in wireless devices such as smart phones or digital tablets.

BACKGROUND ART

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Near Field Communication (NFC) is a technology based on Radio Frequency Identification (RFID) that has emerged in the recent years.

NFC mainly enables the exchange of small amount of data between an NFC device at one end, and another NFC device, an NFC smart card or and NFC reader at the other end.

Potential applications of NFC technology comprise e-ticketing and e-payment, for instance. In both latter cases, a NFC device may, for instance, emulate a contactless credit card which is compliant with existing standards such as EMV (Europay Mastercard Visa).

Nowadays, such wireless devices as smartphones or digital tablets, for instance, are among the favourite user devices for implementing NFC technology.

In this case, the wireless device may act as a wireless contactless smart card using a card emulation mode and also a contactless reader using a reader emulation mode. It may also be able to communicate directly with another NFC device using a peer-to-peer mode.

In order to determine and guarantee that such devices are able to operate according to NFC related standards and specifications, a test of the whole NFC system may be carried out prior to the delivery, for instance, to a wireless device manufacturer or directly to the end-user.

However, all the components of a NFC system being usually combined in a single chip, the testing of the NFC functionality may be very complex.

Conventionally, Radio Frequency (RF) chips are tested using either a rack and stack set of bench top equipment connected to a Personal Computer (PC) or with a complete set of commercially available Automated Test Equipment (ATE) which uses both external hardware and software parts to set-up and control the execution of a test program.

However, those equipments are costly and not economically suitable for testing high volumes of complex RF Integrated Circuits (ICs).

One alternative to avoid the added cost of using an external ATE instrumentation to test RF ICs may be to use built-in-self test (BIST) function directly in the Integrated circuit (IC).

The BIST approach uses on-chip signal generation and analysis in order to provide on-chip tester resources that would otherwise be implemented in external ATE, for instance.

Loop-back testing is a good candidate technique to implement BIST, wherein a signal is transmitted from a transmitter (TX) of a communication device and returned to a receiver (RX) of the communication device after passing through all the circuitry as a way to determine whether the device operates correctly or not.

However, examples of implementation of this technique focused, so far, on RF transceiver block test and logic block test, thanks to, for instance, the use of switches inserted in the RF transceiver block and in a test circuit, as described in document (1000), BOYON, Kim, et al. "An advanced full path loop-back testing techniques for embedded RF Identification (RFID) System-on-a-Chip (SoC) applications". *Microwave Symposium Digest,* 2008 *IEEE MTT-S International.* p. 85-89.

In document (1000), RF transceiver block test comprises analysis of RF signal characteristics such as channel power flatness of TX signal, Low Pass Filter of TX and RX parts or RX baseband gain. On the other hand, logic block test comprises analysis of Analog to Digital and Digital to Analog components.

In view of the foregoing, it appears that testing of NFC mode of operations such as card emulation mode, reader emulation mode and peer-to-peer mode is not adequately addressed in the art and that no proper solutions have been proposed to date.

SUMMARY OF INVENTION

The present disclosure proposes to use the BIST approach along with loop-back technique to test the different modes of operations of a wireless device implementing the NFC technology.

A first aspect of the proposed solution relates to a method of self-test for a near-field communication, NFC, radio frequency, RF, front-end unit comprising one NFC antenna driver and at least one NFC unit from a group comprising a NFC reader and a NFC card emulator, the RF front-end unit being connected to a digital front-end unit, the antenna driver and the NFC unit of the RF front-end unit being interconnected through a first connection line via respective first input-output interfaces and being also interconnected through a second connection line via respective second input-output interfaces, and the digital front-end unit being connected to the second connection line, the method comprising:

activating the NFC antenna driver and the NFC unit based on control signals received from the digital front-end through the second connection line;

generating, at the NFC antenna driver a first signal sent onto the first connection line, by modulating a respective first bitstream received from the digital front-end through the second connection line;

retrieving, at the NFC unit, a second bitstream from the second connection line, by demodulating the first signal, onto the second connection line; and, determining an outcome of the self-test by monitoring the demodulated signal.

A second aspect relates to an apparatus for self-test of a near-field communication, NFC, radio frequency, RF, front-end unit comprising one NFC antenna driver and at least one NFC unit from a group comprising a NFC reader and a NFC card emulator, the RF front-end unit being connected to a digital front-end unit, the antenna driver and the NFC unit of the RF front-end unit being interconnected through a first connection line via respective first input-output interfaces and being also interconnected through a second connection line via respective second input-output interfaces, and the digital front-end unit being connected to the second connection line, the apparatus comprising a processor configured to command:

means for activating the NFC antenna driver and the NFC unit based on control signals received from the digital front-end through the second connection line;

means for generating a first signal onto the first connection line by modulating a respective first bitstream sent by the digital front-end;

means for retrieving, at the NFC unit, a second bitstream from the second connection line, by demodulating the first signal, onto the second connection line; and, means for determining an outcome of the self-test by monitoring the demodulated signal.

A third aspect relates to a wireless device comprising a load with a variable impedance value and an apparatus as defined by the second aspect of the proposed solution.

A fourth aspect relates to a wireless device comprising a physical antenna and an apparatus as defined by the second aspect of the proposed solution, wherein the physical antenna is connected to antenna terminals of the NFC RF front-end and the antenna terminals are connected to the first connection line.

Thus in a wireless device embodying the principles of such mechanism, weakness of testing of NFC mode of operations is at least partially overcome by using the BIST approach along with loop-back technique. This way, all the modes of operations of a NFC technology may be fully tested before the NFC system being delivered to the end-user or passed to the next stage of manufacturing, thus ensuring better quality compliance.

In one embodiment, the NFC unit is the NFC reader and the first signal emulates a signal which could be received from an external NFC card according to the NFC Standard This realisation considers the antenna driver and the reader by testing the ability of the reader to detect a NFC card that is emulated by the antenna driver.

In another embodiment, the unit is the NFC card emulator and the first signal emulates a signal which could be received from an external NFC reader according to the NFC Standard. This realisation considers the antenna driver and the card mode emulator by testing the ability of the card mode emulator to detect a NFC reader that is emulated by the antenna driver.

In yet another embodiment, the NFC unit comprises both the NFC reader and the NFC card emulator, and the first signal modulates a bitstream having no useful data, the method further comprising before the demodulating, the first signal further modulates a third bitstream, in order to generate a second signal that emulates a signal transmitted from an external NFC card. This realisation considers the antenna driver, the reader and the card mode emulator by testing the ability of the card mode emulator to modulate a signal sent by a NFC reader that is emulated by the antenna driver. The ability of demodulating the modulated signal is also tested.

If desired, the monitoring comprises comparing the second bitstream, with the respective first bitstream, and wherein the outcome of the self-test is defined as being passed with success if the second bitstream is equal to the first bitstream and as a failure if the second bitstream is not equal to the first bitstream. Other alternatives for assessing the outcome of the testing may be considered, for instance, based on a transmitted bitstream and a received bitstream.

Possibly, the NFC RF front-end unit further comprises a load with a variable impedance value coupled to the antenna driver unit, and wherein an Amplitude Shift Keying, ASK, modulation is performed by varying the impedance value of said load according to the first bitstream. This realisation emulates the presence of a physical antenna thanks such that self-test can be performed while no physical antenna is attached to the NFC RF front-end.

In another embodiment, the NFC RF front-end further comprises antenna terminals to which a physical antenna can be connected, and wherein the physical antenna is considered to be well connected to the NFC RF front-end unit if the self-test is to be declared a success when the physical antenna is both attached and not attached. This realisation considers a physical antenna attached to the NFC RF front-end unit such that its proper connection could be asserted or not.

BRIEF DESCRIPTION OF DRAWINGS

A more complete understanding of the proposed solution may be obtained from a consideration of the following description in conjunction with the drawings, in which like reference numbers indicate the same or similar element and in which:

FIG. 2 is a flow diagram illustrating embodiments of the proposed method.

DESCRIPTION OF EMBODIMENTS

Figure 1A:
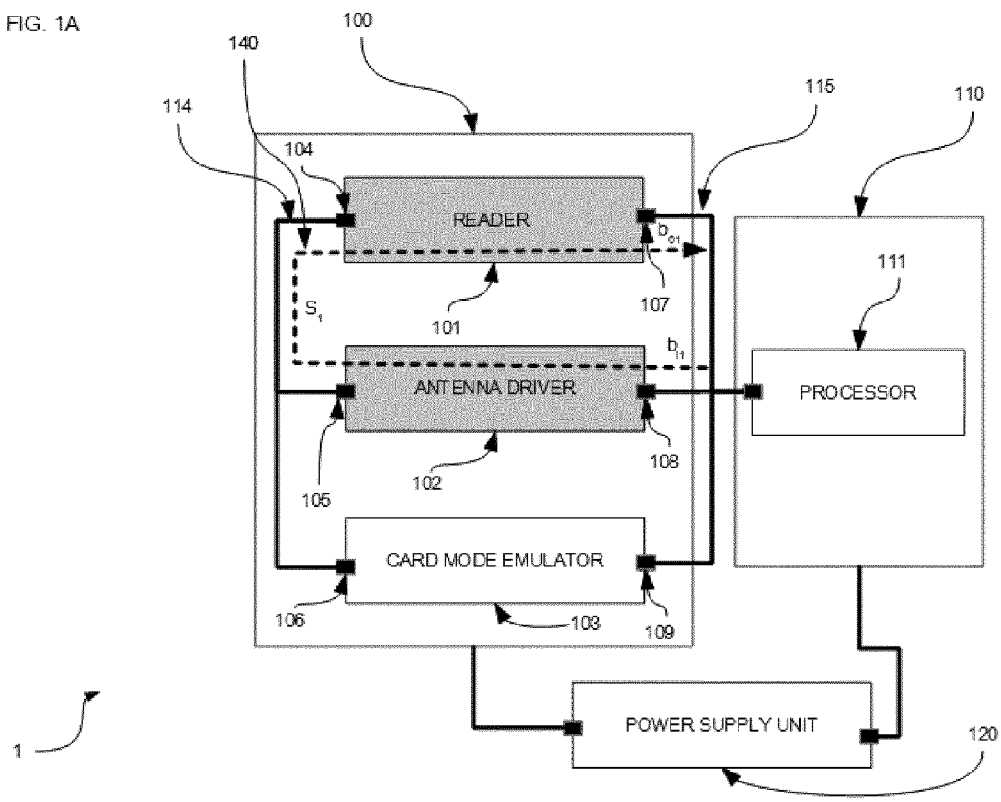
FIG. 1A is a block diagram illustrating an embodiment of the proposed apparatus in the absence of an external antenna.

FIGS. 1A-1C and FIG. 1D are block diagrams which schematically illustrate embodiments of the proposed apparatus in the absence and in the presence, respectively, of a physical antenna. The physical antenna may be internal or external to the IC embodying the NFC unit and its associated self-test apparatus.

Since the embodiments of FIGS. 1A-1D have a common structure and similar connections, these will be described first before successively considering each figure in more details.

Referring to FIGS. 1A-1D, there is shown therein a user device 1 comprising a RF front-end 100 coupled to a digital front-end unit 110, both being powered by e.g. a common power supply unit 120.

The user device 1 may be, for instance, a wireless device such as a smartphone or a digital tablet wherein it is implemented at least a short range radio communication technology such as Near-field Communication (NFC) that enables to automatically detect and identify, for instance, specific locations, objects and individuals without any need for manual intervention from the user.

In the following description, NFC would be considered as the implemented communication technology although other short range radio communication technologies may be used without departing from the scope of the proposed solution. Hence, device 1 will be considered as a matter of example, as being a NFC compliant user device in the description which follows.

Referring to FIGS. 1A-1D, the RF front-end 100 comprises one antenna driver 102, and one reader 101 and/or one card mode emulator 103. These three components are commonly available in any user device implementing the NFC technology such that the device can behave as a NFC reader, if both the antenna driver 102 and the reader 101 are available or as a NFC card, if both the antenna driver 102 and the card emulator 103 are available.

In the shown examples, the reader 101, the antenna driver 102 and the card mode emulator 103 have at least an input-output interface 104, 105 and 106, respectively. These interfaces are interconnected, such that communication can occur between the reader 101, the antenna driver 102 and the card mode emulator 103, via a connection line 114. The reader 101, the antenna driver 102 and the card mode emulator 103 further have at least an input-output interface 107, 108 and 109, respectively, said interfaces being interconnected via a connection line 115, so that communication can occur between the reader 101, the antenna driver 102, the card mode emulator 103, via said connection line 115. This way, for instance, any signal at the output 105 of the antenna driver may be driven to the reader 101 and/or the card mode emulator 103.

It will be appreciated that there may be more than one input/output interface available on the reader 101, the antenna driver 102 and the card mode emulator, respectively. Also, an input/output interface may have separate pins for input and output, respectively, and may also be input-only such that only ingress signals can be accepted or output-only such that only egress signals can be accepted.

Referring further to FIGS. 1A-1D, the reader 101 may comprise two input/output interfaces 104, 107 wherein interface 104 is e.g. an input-only interface and interface 107 is e.g. an input/output interface. The antenna driver 102 may comprise two input/output interfaces 105, 108 wherein interface 105 is e.g. an output-only interface and interface 108 is e.g. an input-only interface. Finally, the card mode emulator may comprise two input/output interfaces 106, 109 wherein both are e.g. input/output interfaces.

The reader 101 may be configured to read data from a NFC component such as another NFC reader of a NFC card. A NFC card is generally a low cost and low capacity device which does not contain any power source such that it uses an external source to perform any activity. Also, a NFC card is usually configured to store data that can be read by a NFC reader.

The antenna driver 102 is configured to generate either an unmodulated signal (i.e. a pure RF sine wave) or a signal modulating a given bitstream. In the case of NFC, the operating frequency of such signals is for instance in a frequency range around 13.56 MHz.

The card mode emulator 103 may be configured to either read data received from a NFC reader or transmit data to a NFC reader as if the data was data compliant with the NFC Standard received from a NFC card. Basically, the card emulator 103 emulates a real NFC card inside the NFC device 1 such that the NFC device 1 may behave as if it was a NFC card as already described above.

Referring further to FIGS. 1A-1D, the digital front-end unit 110 may comprise a processor 111 connected to the connection line 115 so that communication can occur with the reader 101, the antenna driver 102 and the card mode emulator 103.

The processor 111 is also configured to act both as a stimuli generator and a response analyser. The stimuli generator function enables the processor 111 to control, at least, the reader 101, the antenna driver 102 and the card mode emulator 103. The response analyser function enables the processor 111 to monitor, input and output bitstreams of a particular loop-back in order to determine whether a particular test is successful or not.

In the embodiment shown in FIG. 1A, only the reader 101 and the antenna driver 102 are greyed out in the RF front-end 100, indicating that they are activated while the card mode emulator 103 is deactivated. In fact, in FIG. 1A illustrates a first testing of the functionality of both the reader 101 and the antenna driver 102 altogether. Namely, it is tested the ability of the reader 101 to correctly decode a signal that is received from a NFC card. In other words, it is tested whether the reader 101 can detect the presence of a NFC card located in its vicinity.

Additionally, the first testing scheme can be schematically summarised by the loop-back path illustrated by the arrow 140 in FIG. 1A, which originates from the digital front-end unit 110 and goes through both the antenna driver 102 and the reader 101.

In the aforementioned first testing, the antenna driver 102 emulates an NFC card by generating a signal $S_1$ as if signal $S_1$ was received from an external NFC card.

The first testing is performed by first activating both the reader 101 and the antenna driver 102. This activation may be performed under control of the processor 111 which can generate stimuli, such as control signals, that are presented to the input/output interface 107, 108 of both the reader 101 and the antenna driver 102 via the connection line 115. The stimuli could be a predefined bitstream known by both the reader 101 and the antenna driver 102 such that when said bitstream is received, both get activated.

It will be appreciated that since the card mode emulator 103 is not tested in this embodiment, it is not necessary to have it activated. Therefore, the card mode emulator 103 may be deactivated for the purpose of this first testing. This deactivation may also be performed by the processor 111 which could generate the control signals, which can be presented to the input/output interface 109 of the card mode emulator via the connection line 115. These control signals may take the form of stimuli, e.g. a predefined bitstream known by the card mode emulator 103 such that when said bitstream is received, it gets deactivated.

In a second step of the first testing, the antenna driver 102 is required to generate the signal $S_1$ modulating a bitstream $b_{i1}$ compliant with a Standard such as NFC. The bitstream $b_{i1}$ is generated by the processor 111 and presented to the input-only interface 108 of the antenna driver 102 via the connection line 115. In digital logic, the bitstream $b_{i1}$ would be a sequence of 0s and 1s.

An example of modulation used by the antenna driver 102 may be, for instance, the Amplitude Shift Keying (ASK) with different modulation indexes expressed in percentage. However, other modulation schemes may be used as well, such as Frequency Shift Keying (FSK) or Quadratic Amplitude Modulation (QAM).

In the case where ASK is used, load-modulation technique can be relied upon to generate the modulated signal $S_1$ thus enabling bitstream transfer between the antenna driver 102 and the reader 101.

In fact, in NFC technology, due to coupling between the antenna of a NFC reader and a NFC card, a variation in the impedance of the NFC card causes phase and/or amplitude changes on the antenna voltage of the NFC reader, thus creating an ASK modulation. Thus, controlling these variations by a bitstream can lead to the bitstream being transferred from the NFC card to the NFC reader.

Signal $S_1$ is generated, e.g. at the output-only interface 105 of the antenna driver 102 such that it is available to all the components connected to the connection line 114.

In a third step, signal $S_1$ is received at the input-only interface 104 of the reader 101, via the connection line 114, in order to be demodulated. Thus, the NFC reader 101 is able to retrieve an output bitstream $b_{o1}$ from the demodulated signal received at its input/output interface 107.

Therefore, as it can be noted by the one with ordinary skills in the art, in the event were ASK modulation is used, the antenna driver 102 may comprise an ASK modulator and the reader 101 may comprise an ASK demodulator.

In a fourth step, the bitstream $b_{o1}$ is received by the processor 111 via the connection line 115 which is monitored by the processor 111.

During this monitoring by the processor 111, the received bitstream $b_{o1}$ is compared with the input bitstream $b_{i1}$. When bitstreams $b_{i1}$ and $b_{o1}$ are identical, the test is considered to be successful. Otherwise, when bitstream $b_{i1}$ and $b_{o1}$ are not identical, the test is considered to have failed and at least one of the components involved in the testing is considered to be malfunctioning. In the latter case, further investigations may need to be done in the case where one wants to identify the malfunctioning component, for instance. Another possibility may consist in dropping from the product line the related NFC RF front end 100 such that it is not delivered to any end-user or third party.

Whatever the outcome of the first testing is, a memory such as a register of the processor 111 or of the digital front-end unit 110 may be positioned to a specific value in order to indicate said outcome of the testing. This register may, for instance, be readable by the processor 111 or another component to monitor a series of self-test of the same components.

In case of failure of the test, the processor 111 may be configured to at least try to identify the causes of the failure. For instance, the identification of the causes may be based on the differences between bitstreams $b_{i1}$ and $b_{o1}$. Hence, depending on a particular difference between both bitstream $b_{i1}$ and $b_{o1}$, a specific known fault or a range of possible faults may be identified by the processor 111 in order to pinpoint the origin of the failure and thus ease any potential investigation of the failure. The association of a particular difference with a specific known fault or a range of faults may have been determined previously, for instance in a laboratory.

Figure 1B:
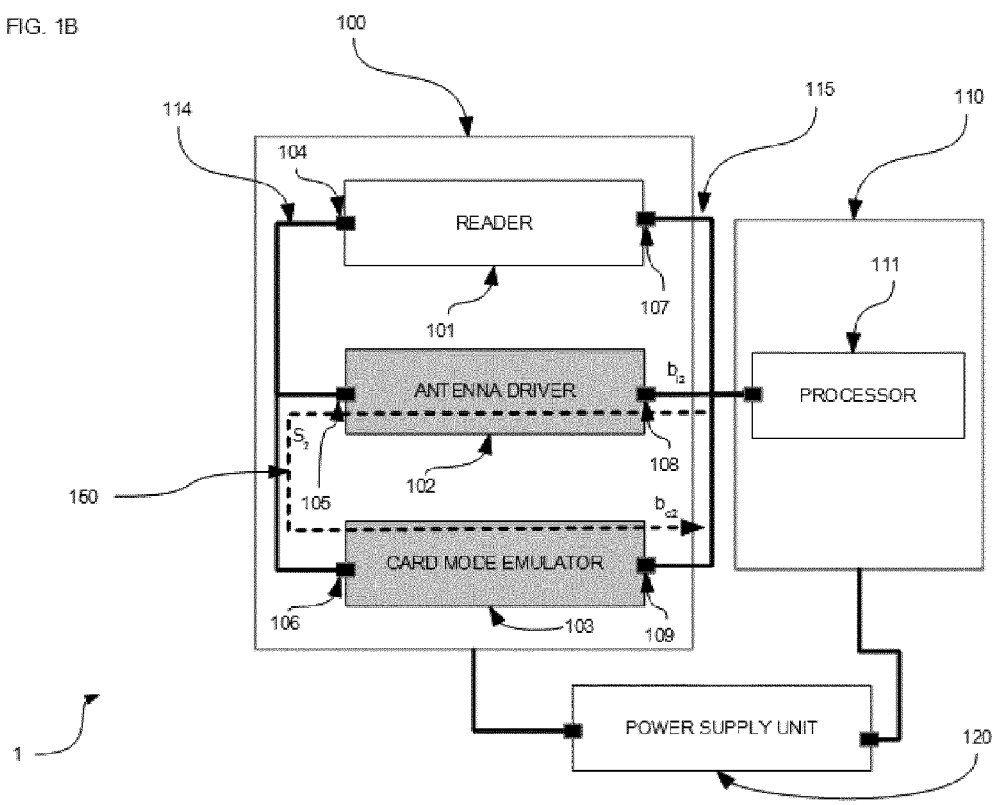
FIG. 1B is a block diagram illustrating another embodiment of the proposed apparatus in the absence of an external antenna.

Referring to the embodiment shown in FIG. 1B, only the antenna driver 102 and the card mode emulator 103 are greyed out in the RF front-end 100, indicating that they are activated while the NFC reader is deactivated. In fact, FIG. 1B illustrates a second testing of the functionality of both the antenna driver 102 and the card mode emulator 103 altogether. Namely, it is tested the ability of the card mode emulator 103 to correctly decode a signal that is received from an external NFC reader. In other words, it is tested whether the card mode emulator 103 can detect the presence of a NFC reader located in its vicinity.

Additionally, the second testing scheme can be schematically summarised by the loop-back path illustrated by the arrow 150 in FIG. 1B, which originates from the digital front-end unit 110 and goes through both the card mode emulator 103 and the antenna driver 102.

In the aforementioned second testing, the antenna driver 102 emulates an NFC reader by generating a signal $S_2$ as if signal $S_2$ was sent by an external NFC reader.

The second testing is performed by first activating both the antenna driver 102 and the card mode emulator 103. This activation may be performed under the control of the processor 111 which can generate stimuli, such as control signals that are presented to the input/output interface 108, 109 of both the antenna driver 102 and the card mode emulator 103 via the connection line 115. The stimuli could be a predefined bitstream known by both the antenna driver 102 and the card mode emulator 103 such that, when said bitstream is received, both get activated.

It will be appreciated that since the reader 101 is not tested in this embodiment, it is not necessary to have it activated. Therefore, the reader 101 may be deactivated for the purpose of this second testing. This deactivation may also be performed by the processor 111 as already described in the foregoing first testing regarding the card mode emulator 103.

In a second step of the second testing, the antenna driver 102 is required to generate the signal $S_2$ modulating a bitstream $b_{i2}$ compliant with a Standard such as NFC. The bitstream $b_{i2}$ is generated by the processor 111 as already described in the foregoing first testing.

Signal $S_2$ is generated, e.g. at the output-only interface 105 of the antenna driver 102 such that it is available to all the components connected to the connection line 114.

In a third step, signal $S_2$ is received at the input/output interface 106 of the card mode emulator 103, via the connection line 114, in order to be demodulated. Thus, the NFC reader 101 is able to retrieve an output bitstream $b_{o2}$ from the demodulated signal, at the input/output interface 109 of the card mode emulator 103.

As explained above, in the event were ASK modulation is used, the antenna driver 102 may comprise at least an ASK modulator and the card mode emulator 103 may comprise at least an ASK demodulator.

In a fourth step, the bitstream $b_{o2}$ is received by the processor 111 via the connection line 115 in order to be monitored by the processor 111.

During this monitoring, the output bitstream $b_{o2}$ is compared with the input bitstream $b_{i2}$ as already described above regarding the first testing.

Figure 1C:
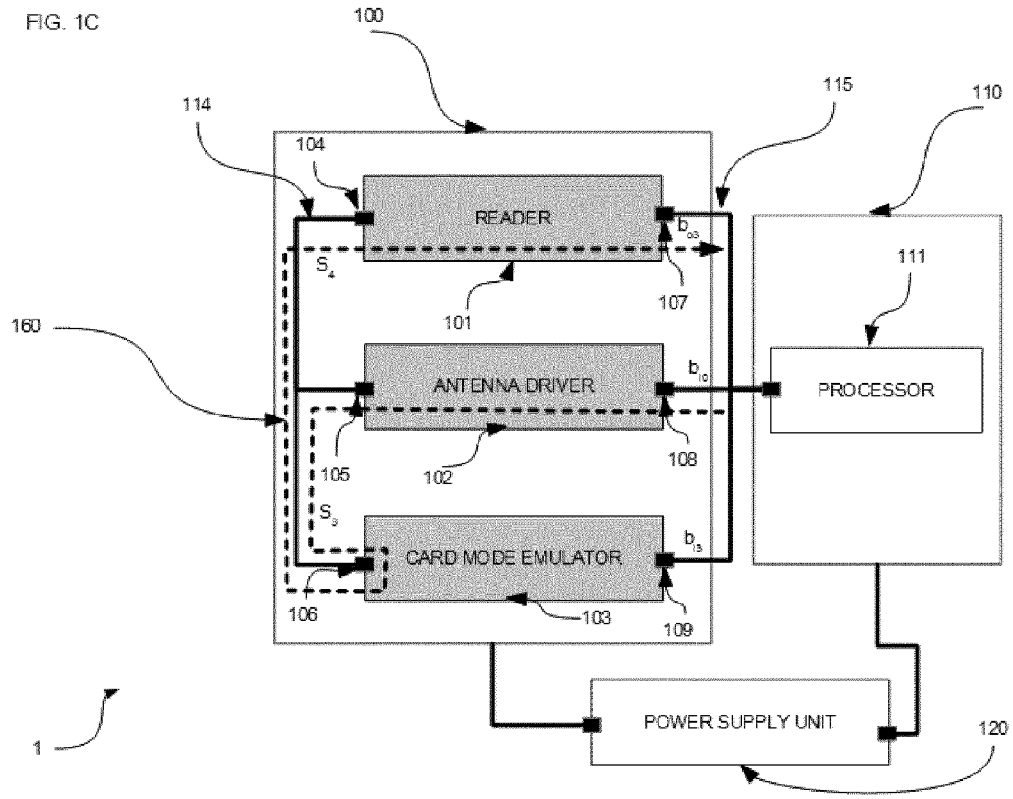
FIG. 1C is a block diagram illustrating yet another embodiment of the proposed apparatus in the absence of an external antenna.

Referring to the embodiment shown in FIG. 1C, the reader 101, the antenna driver 102 and the card mode emulator 103 are greyed out in the RF front-end 100, indicating that they are activated. In fact, FIG. 1C illustrates a third testing of the functionality of the reader 101, the antenna driver 102 and the card mode emulator 103 altogether. Namely, it is tested the ability of the card mode emulator 103 to correctly modulate an unmodulated signal, that is received from a NFC reader, with a given bitstream. In other words, it is tested whether the card mode emulator 103 can transmit data to a NFC reader located in its vicinity.

Additionally, the third testing scheme can be schematically summarised by the loop-back path illustrated by the arrow 160 in FIG. 1C, which originates from the digital front-end unit 110 and goes through the reader 101, the antenna driver 102 and the card mode emulator 103.

In the aforementioned third testing, the antenna driver 102 emulates an NFC reader by generating an unmodulated signal (i.e. RF sine wave) $S_3$ as if signal $S_3$ was sent by a NFC reader.

The third testing is performed by first activating the reader 101, the antenna driver 102 and the card mode emulator 103 altogether. This activation may be performed under the control of the processor 111 which can generate stimuli, such as control signals, that are presented to the input/output interface 107, 108, 109 of the reader 101, the antenna driver 102 and the card mode emulator 103 via the connection line 115. The stimuli could be a predefined bitstream known by the reader 101, the antenna driver 102 and the card mode emulator 103 such that; when said bitstream is received, they get activated.

In a second step of the third testing, the antenna driver 102 is required to generate an unmodulated signal $S_3$ that does not contain any useful data. This generation is performed by the antenna driver 102 as already described in the foregoing, by modulating an unmodulated signal with the bitstream $b_{i0}$ representing no useful data. For instance, in digital logic, the modulated bitstream would be a series of 0s.

Signal $S_3$ is generated, e.g. at the output-only interface 105 of the antenna driver 102 such that it is available to all the components connected to the connection line 114.

In a third step, signal $S_3$ is received at the input/output interface 106 of the card mode emulator 103, via the connection line 114, in order to modulate a bitstream $b_{i3}$ received from the processor 111 as already described in the foregoing, thus enabling the creation of a signal $S_4$.

Signal $S_4$ is generated, e.g. at the input/output interface 106 of the card mode emulator 103 such that it is available to all the components connected to the connection line 114.

In a fourth step, signal $S_4$ is received at the input-only interface 104 of the reader 101, via the connection line 114, in order to be demodulated. Thus, the NFC reader 101 is able to retrieve an output bitstream $b_{o3}$ of the demodulated signal, at the input/output interface 107.

As explained above, in the event were ASK modulation is used, the antenna driver 102 may comprise at least a RF sine wave generator, the card mode emulator 103 may comprise at least an ASK modulator and the reader 101 may comprise at least an ASK demodulator.

In a fifth step, the bitstream $b_{o3}$ is received by the processor 111 via the connection line 115 in order to be monitored by the processor 111.

During this monitoring, the output bitstream $b_{o3}$ is compared with the input bitstream $b_{i3}$ as already described in the foregoing first and second testing.

As described above with reference to FIGS. 1A-1C, the first, second and third testing processes may be executed according to at least one NFC standard such as ISO/IEC 14443 (Type A, Type B) or JIS X 6319.4 (Type F), with one particular protocol and at one particular bit rate. The execution of the first, second or third testing according to a particular NFC standard ensures obtaining a certain likelihood of the performance of the reader 101, the antenna driver 102 and the card mode emulator 103 for that particular NFC standard. Alternatively, one could apply the proposed solution on several NFC standards along with different protocols and/or bitrates such that a large or full range of parameters is tested in order to assess the performance of the reader 101, the antenna driver 102 and the card mode emulator 103 for a particular set of parameters.

Embodiments of FIGS. 1A-1C, may be implemented and executed without the need of a real physical antenna being connected to the RF front-end 100. In fact, the absence of a real antenna can be compensated by the use of an on-chip scaled resistor contained, for instance, in the antenna driver 102. The on-chip scaled resistor can be used to scale the signal mirroring from the antenna driver 102 to the reader 101, thus replacing a real antenna. For instance, the on-chip resistor load may be driven through a matched amplifier that is 1/24th the size of the output of the antenna driver 102.

Thanks to this configuration, the loading by a real antenna can be emulated. Namely, it is be possible to emulate different kind of real antennas by just varying the impedance of the on-chip resistor. This way, the proposed solution offers the possibility to test the functionality of an NFC device without the need of using any real antenna in the overall testing process. This possibility is well suited for test cases which may occur, for instance, during wafer testing, aging testing or testing of other defects usually performed during maintenance operation, wherein antennas are not yet mounted.

However, the proposed solution may also be used along with a real physical antenna 130 coupled or connected to the RF front-end 100.

Figure 1D:
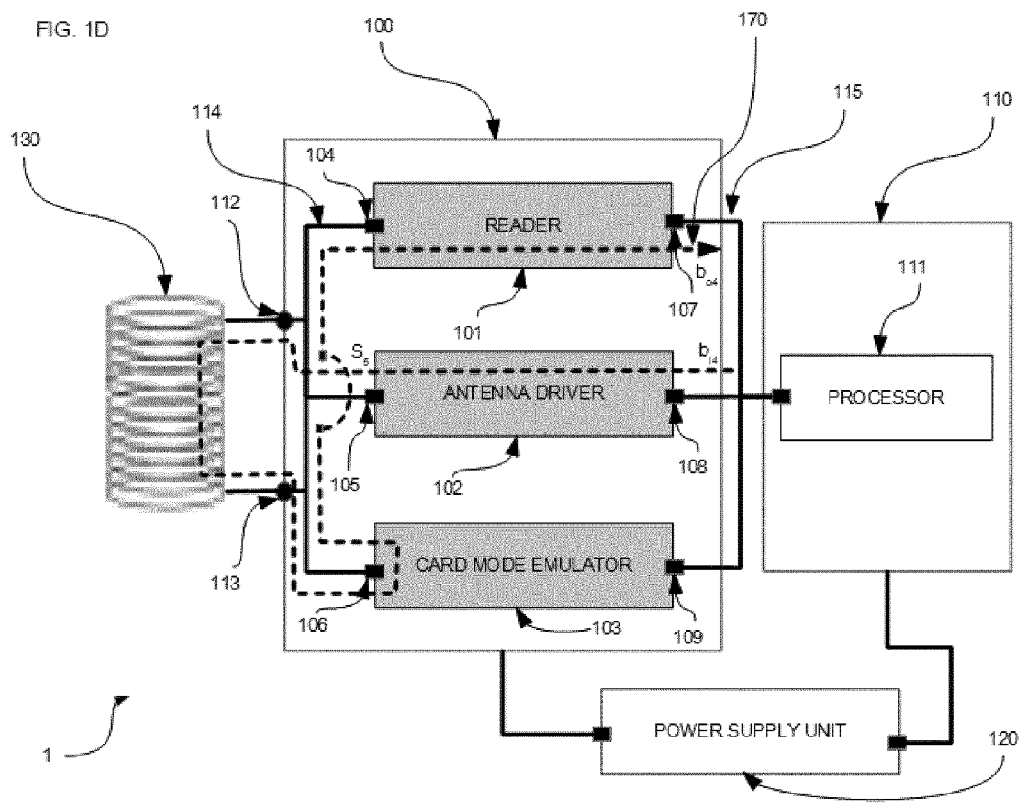
FIG. 1D is a block diagram illustrating yet another embodiment of the proposed apparatus with the presence of an external antenna.

Referring to the embodiment of FIG. 1D, a real antenna 130 may thus be connected to the RF front-end 100 through antennas terminals 112, 113. Additionally, the antenna terminals are connected to the connection line 114. Therefore, as it can be noticed, FIG. 1D correspond to FIG. 1C with the addition of the antenna 130, the antenna terminals 112, 113, the connection of the antenna 130 to the antennas terminals 112, 113 and the connection of the antenna terminals to the connection line 114. In fact, in FIG. 1D illustrates a fourth testing of the functionality of the reader 101, the antenna driver 102, the card mode emulator 103 and the real antenna 130 altogether. Namely, it is tested the ability of the card mode emulator 103 to correctly modulate an unmodulated signal that is received from a NFC reader having as an antenna the real antenna 130, with a given bitstream. In other words, it is tested whether the card mode emulator 103 can transmit data to a NFC reader comprising a real antenna and being located in its vicinity.

The fourth testing can be schematically summarised by the loop-back path illustrated by the arrow 170 in FIG. 1D, which originates from the digital front-end unit 110 and goes through the antenna driver 102, the real antenna 130 via the antenna terminals 112,113, the card mode emulator 103 and the reader 101.

In the foregoing fourth testing, the antenna driver 102 emulates an NFC reader by generating a signal $S_5$ as if signal $S_5$ was sent by a NFC reader comprising a real antenna 130.

The fourth testing is performed by first activating the reader 101, the antenna driver 102 and the card mode emulator 103 altogether. This activation may be performed under the control of the processor 111 which could generate stimuli, such as control signals, that are be presented to the input/output interface 107, 108, 109 of the reader 101, the antenna driver 102 and the card mode emulator 103 via the connection line 115. The stimuli could be a predefined bitstream known by the reader 101, the antenna driver 102 and the card mode emulator 103 such that, when said bitstream is received, they get activated.

In a second step of the fourth testing, the antenna driver 102 is required to generate the signal $S_5$ modulating a bitstream $b_{i4}$ compliant with a standard such as NFC. The bitstream $b_{i4}$ is generated by the processor 111 as already described in the foregoing first testing.

Signal $S_5$ is generated at the output-only interface 105 of the antenna driver 102 and is transmitted to the real antenna 130 via the antenna terminal 112. The real antenna 130 radiates the signal $S_5$ through the antenna terminal 113.

In a third step, signal $S_5$ is received at the input/output interface 106 of the card mode emulator 103, via the connection line 114 through the antenna terminal 113, and transmitted to the reader 101.

In a fourth step, signal $S_5$ is received at the input-only interface 104 of the reader 101, via the connection line 114, in order to be demodulated. Thus, the NFC reader 101 is able to retrieve, an output bitstream $b_{o4}$ of the demodulated signal, at the input/output interface 107

As explained above, in the event where ASK modulation is used, the antenna driver 102 may comprise at least a RF sine wave generator, the card mode emulator 103 may comprise at least an ASK modulator and the reader 101 may comprise at least an ASK demodulator.

In a fifth step, the bitstream $b_{o4}$ is received by the processor 111 via the connection line 115 in order to be monitored by the processor 111.

During the monitoring, the output bitstream $b_{o4}$ is compared with the input bitstream $b_{i4}$ as already described in the foregoing with reference to the first, second and third testing.

In view of that, the on-chip scaled resistor replacement feature for real antenna 130 may be deactivated. In fact, the purpose of such feature is to emulate the presence of a real antenna 130, for instance, during maintenance operations were antennas are not yet mounted on the NFC RF front-end unit 100. This deactivation may be triggered based on a particular event. For instance, it could always be assumed that real antenna 130 is considered to be mounted on the NFC device 1 after first, second and third testing have been performed successfully or not. This way, a register, for instance, present in the digital front-end unit 110 may be positioned to a specific value in order to indicate the number of testing that have been made or, for instance, to indicate that all previous testing have been made successfully or not. This register may be operated, for instance, by the processor 111. Therefore, load replacement could be deactivated based on the value contained in that register. For instance, it could also be assumed that after three self-tests, corresponding to the first, second and third testing, the value three to set onto the register and that the antenna is considered to be mounted. Thus, for instance, when the value three is read from the register, for instance by the processor 111, the load replacement may be deactivated. Another possibility is to set manually the status of the load-replacement just before or after the antenna is physically installed and connected.

Additionally, when a real antenna 130 is present, it is possible to launch again the first, second and third testing. This way, it is possible to check whether a real antenna 130 is well mounted onto a particular user device 1. In fact, if at least one of the testing of the first, second and third testing was successful before the antenna 130 was mounted, then launching that or these successful tests again when the real antenna 130 is connected, would help identifying whether the antenna is well connected or not to the device 1. This is based on the fact that if the further tests are not successful after the antenna is mounted, although there were successful when the antenna was not mounted, then it can be deduced that real antenna 130 is not well connected. Therefore, this additional testing may help detecting a defect such as a real antenna 130 not being well connected to a RF front-end 100 of a NFC device 1, for instance.

FIG. 2 is a flow diagram which schematically illustrates an embodiment of the proposed method with the embodiment as already described above for the fourth testing. Depending on the embodiment, additional steps may be added, others removed, and the ordering of the steps rearranged.

Turning now to FIG. 2, in step S200, a NFC system is activated. For instance, this activation could correspond to the activation of a reader 101, an antenna drive 102 and a card mode emulator 103 as already described above.

After the required components of the NFC system are activated, in a step S210, it generated an unmodulated first signal $S_3$, for instance with the antenna driver 102 as already described above.

The first signal $S_3$ is then load-modulated with a given bitstream $b_{i3}$, in a step S220, for instance by the card mode emulator 103 as already described above, thus generating the modulated signal $S_4$.

The modulated signal $S_4$, that is resulting from the first signal $S_3$ being load-modulated in step S220, is thus demodulated for instance by the reader 101, in a step S230, as already described above, thus enabling the retrieval of a bitstream $b_{o3}$.

Afterwards, in a step S240, a monitoring of the demodulated signal is performed, for instance by the processor 111, such that the bitstream $b_{o3}$ contained in the demodulated signal is compared with the given bitstream $b_{i3}$ introduced in step S220, as already described above.

In a step S250, it is evaluated whether the test is successful or not as already described above. This outcome may be stored, for instance in a data register of the digital front-end unit 110.

Finally, in a step S250, the status of the test is reported to the end-user. For instance, if a display is available on the NFC device 1, a message indicating whether the NFC device 1 is operable or not may be shown to the end-user. During integration of the RF front-end 100 on a host platform, a message stating whether an antenna 130 of the NFC device 1 is well connected or not may be shown. After that, the algorithm would stop.

The proposed solution enables to test all the functionality of, for instance, a NFC front-end 100 whatever the standard, protocol or data rate used. All the testing can be performed on-chip without the need of any external equipment such as an ATE. Furthermore, the testing can be applied on the NFC front-end without any antenna being attached to it in order to test only the NFC functionality. However, with the presence of an antenna, the testing can also be used to test whether the antenna is well connected.

In the claims, the word "comprising" does not exclude other elements or steps, and the indefinite article "a" or "an" does not exclude a plurality.

A single unit may fulfil the functions of several items recited in the claims. For instance, the processor 111 may be implemented as two components such as a stimulus generator and a response analyser. The connection line 114 as show in the drawings is just an embodiment and different alternative depending on the used technology may be used as well without departing from the scope of the proposed solution. The mere fact that different features are recited in mutually different dependent claims does not indicate that a combination of these features cannot be advantageously used. Any reference signs in the claims should not be construed as limiting the scope of the proposed solution.

REFERENCE DOCUMENTS LIST

Document (1000), BOYON, Kim, et al. "An advanced full path loop-back testing techniques for embedded RF Identification (RFID) System-on-a-Chip (SoC) applications". *Microwave Symposium Digest*, 2008 *IEEE MTT-S International*. p. 85-89.

The invention claimed is:

1. A method of self-test for a near-field communication, NFC, radio frequency, RF, front-end unit comprising one NFC antenna driver and at least one NFC unit from a group comprising a NFC reader and a NFC card emulator, the RF front-end unit being connected to a digital front-end unit, the antenna driver and the NFC unit of the RF front-end unit being interconnected through a first connection line via respective first input-output interfaces and being also interconnected through a second connection line via respective second input-output interfaces, and the digital front-end unit being connected to the second connection line, the method comprising:

activating the NFC antenna driver and the NFC unit based on control signals received from the digital front-end through the second connection line;

generating, at the NFC antenna driver a first signal sent onto the first connection line, by modulating a respective first bitstream received from the digital front-end through the second connection line;

retrieving, at the NFC unit, a second bitstream from the second connection line, by demodulating the first signal, onto the second connection line; and, determining an outcome of the self-test by monitoring the demodulated signal; wherein:

the NFC unit comprises both the NFC reader and the NFC card emulator, and the first signal modulates a bitstream having no useful data, the method further comprising before the demodulating, the first signal further modulates a third bitstream, in order to generate a second signal that emulates a signal transmitted from an external NFC card.

2. The method of claim 1, wherein:
the third bitstream is received at the front-end of the NFC card mode emulator;
the second signal is generated at the NFC card modulator; and,
the second signal is sent onto the first connection line.

3. The method of claim 1, wherein the monitoring comprises comparing the second bitstream, with the respective first bitstream, and wherein the outcome of the self-test is defined as being passed with success if the second bitstream is equal to the first bitstream and as a failure if the second bitstream is not equal to the first bitstream.

4. The method of claim 1, wherein the NFC RF front-end unit further comprises a load with a variable impedance value coupled to the antenna driver unit, and wherein an Amplitude Shift Keying, ASK, modulation is performed by varying the impedance value of said load according to the first bitstream.

5. The method of claim 1, wherein the NFC RF front-end further comprises antenna terminals to which a physical antenna can be connected, and wherein the physical antenna is considered to be well connected to the NFC RF front-end unit if the self-test is to be declared a success when the physical antenna is both attached and not attached.

6. An apparatus for self-test of a near-field communication, NFC, radio frequency, RF, front-end unit comprising one NFC antenna driver and at least one NFC unit from a group comprising a NFC reader and a NFC card emulator, the RF front-end unit being connected to a digital front-end unit, the antenna driver and the NFC unit of the RF front-end unit being interconnected through a first connection line via respective first input-output interfaces and being also interconnected through a second connection line via respective second input-output interfaces, and the digital front-end unit being connected to the second connection line, the apparatus comprising a processor configured to command:
means for activating the NFC antenna driver and the NFC unit based on control signals received from the digital front-end through the second connection line;
means for generating a first signal onto the first connection line by modulating a respective first bitstream sent by the digital front-end;
means for retrieving, at the NFC unit, a second bitstream from the second connection line, by demodulating the first signal, onto the second connection line; and,
means for determining an outcome of the self-test by monitoring the demodulated signal; wherein the NFC unit comprises both the NFC reader and the NFC card emulator, and the first signal is configured to modulate a bitstream having no useful data, the processor being further configured to command, before the activation the operation of demodulating, the first signal being further configured to modulate a third bitstream, in order to generate a second signal that emulates a signal transmitted from an external NFC card.

7. The apparatus of claim 6, wherein:
the third bitstream is received at the front-end of the NFC card mode emulator;
the second signal is generated at the NFC card modulator; and,
the second signal is sent onto the first connection line.

8. The apparatus of claim 6, wherein the monitoring comprises comparing the second bitstream, with the respective first bitstream, and wherein the outcome of the self-test is defined as being passed with a success if the second bitstream is equal to the first bitstream and as a failure if the second bitstream is not equal to the first bitstream.

9. The apparatus of claim 6, wherein the NFC RF front-end unit further comprises a load, with a variable impedance value, coupled to the antenna driver unit, and wherein an Amplitude Shift Keying, ASK, modulation configured to be performed by varying the impedance value of said load according to the first bitstream.

10. The apparatus of claim 6, wherein the NFC RF front-end further comprises antenna terminals to which a physical antenna can be connected, and wherein the physical antenna is considered well connected to the NFC RF front-end if the self-test is to be declared a success when the physical antenna is both attached and not attached.

11. A wireless device comprising:
a physical antenna,
an apparatus as defined in claim 10 wherein the physical antenna is connected to antenna terminals of the NFC RF front-end and the antenna terminals are connected to the first connection line.

12. A wireless device comprising:
a load with a variable impedance value,
an apparatus as defined in claim 6.

* * * * *